United States Patent
Nelson et al.

(10) Patent No.: US 6,568,123 B2
(45) Date of Patent: May 27, 2003

(54) BLOOD-SUCKING INSECT CONTROL STATION

(75) Inventors: J. Roy Nelson, Pennington, NJ (US); Wayne N. Andrews, Dighton, MA (US); Lantz S. Crawley, Pennington, NJ (US)

(73) Assignee: Bugjammer, Inc., Pennington, NJ (US)

( * ) Notice: Subject to any disclaimer, the term of this patent is extended or adjusted under 35 U.S.C. 154(b) by 0 days.

(21) Appl. No.: 09/885,216

(22) Filed: Jun. 20, 2001

(65) Prior Publication Data

US 2002/0011020 A1 Jan. 31, 2002

Related U.S. Application Data

(63) Continuation-in-part of application No. 09/573,382, filed on May 19, 2000.

(51) Int. Cl.$^7$ .............. A01M 1/02; A01M 1/06; A01M 1/14
(52) U.S. Cl. .......... 43/107; 43/132.1; 43/139; 43/114
(58) Field of Search .............. 43/132.1, 139, 43/114, 124, 107; 84/331, 332, 334, 337, 340, 341, 402, 405, 407; 181/155, 156, 160; 369/30.01, 30.03, 30.06, 30.64, 34.01, 36.01; 381/61, 124, 73.1, 77; 700/94

(56) References Cited

U.S. PATENT DOCUMENTS

| | | | | |
|---|---|---|---|---|
| 2,917,736 A | | 12/1959 | Marotta | 340/385.1 |
| 2,922,999 A | | 1/1960 | Carlin | 367/139 |
| 3,529,691 A | * | 9/1970 | Wesemann | 181/156 |
| 3,683,113 A | | 8/1972 | Stewart | 704/258 |
| 3,826,333 A | * | 7/1974 | Buckwalter | 181/155 |
| 3,884,326 A | * | 5/1975 | Orisek | 181/155 |
| 3,891,970 A | | 6/1975 | Brotz | 340/5.9 |
| 3,893,106 A | | 7/1975 | Schulein | 340/384.2 |
| 3,931,865 A | | 1/1976 | Levitt | 367/139 |
| 3,950,886 A | | 4/1976 | Newhall et al. | 43/112 |
| 3,964,025 A | | 6/1976 | Oosterhouse | 369/34.01 |
| 4,338,593 A | | 7/1982 | Mills | 340/384.2 |
| 4,464,784 A | | 8/1984 | Agnello | 381/61 |
| 4,566,085 A | | 1/1986 | Weinberg | 367/139 |
| 4,725,993 A | | 2/1988 | Owen et al. | 367/139 |
| 4,920,569 A | * | 4/1990 | Yoshio | 381/61 |
| 4,998,091 A | | 3/1991 | Rezmer | 340/384.2 |
| 5,061,918 A | | 10/1991 | Hunter | 340/573.2 |
| 5,111,509 A | | 5/1992 | Takeuchi et al. | 381/338 |
| 5,164,915 A | | 11/1992 | Blyth | 360/69 |
| 5,210,719 A | | 5/1993 | Lawrence | 367/139 |
| 5,231,790 A | | 8/1993 | Dryden et al. | 43/113 |
| 5,241,778 A | | 9/1993 | Price | 43/132.1 |
| 5,255,468 A | | 10/1993 | Chesire, Jr. | 43/113 |
| 5,269,091 A | | 12/1993 | Johnson et al. | 43/98 |

(List continued on next page.)

FOREIGN PATENT DOCUMENTS

| | | | | |
|---|---|---|---|---|
| CH | 601 978 | 7/1978 | ........ | A01M/29/00 |
| DE | 959 861 | 3/1957 | | |
| DE | 28 11 532 | 6/1977 | ........ | H05C/1/02 |
| DE | 26 22 101 | 12/1977 | ........ | A01M/5/00 |

Primary Examiner—Darren W. Ark
(74) Attorney, Agent, or Firm—Darby & Darby

(57) ABSTRACT

An insect control station provides an analog signal to a speaker and delivers acoustic energy from the speaker to a resonator positioned in the path of the acoustic energy. The analog signal can be provided from a memory by way of a digital to analog converter, from a digital signal processor, or from a mechanical element. Preferably, the acoustic energy emitted from one or more of the control stations of any of these arrangements is simulative of at least a portion of a heartbeat. The control station can include a surface that supports a pesticide, a gluey substance, an attractant (e.g., a pattern), and can deliver one or more feeding stimulants such as acetone, lactic acid, octenol, heat, carbon dioxide or some other byproduct of respiration or digestion.

47 Claims, 6 Drawing Sheets

U.S. PATENT DOCUMENTS

| | | |
|---|---|---|
| 5,311,697 A | 5/1994 | Cavanaugh et al. ........ 43/132.1 |
| 5,339,007 A | 8/1994 | Walton ........................ 315/205 |
| 5,386,472 A * | 1/1995 | Pfaff et al. .................. 381/73.1 |
| 5,455,779 A * | 10/1995 | Sato et al. .................. 381/73.1 |
| 5,468,938 A | 11/1995 | Roy ............................ 219/690 |
| 5,657,576 A | 8/1997 | Nicosia ...................... 43/132.1 |
| 5,734,728 A | 3/1998 | Meissner ...................... 381/89 |
| 5,892,182 A | 4/1999 | Newman ..................... 181/156 |
| 5,943,815 A | 8/1999 | Paganessi et al. ............. 43/107 |
| 6,031,916 A * | 2/2000 | Saito et al. ..................... 381/61 |
| 6,032,406 A | 3/2000 | Howse et al. .................. 43/114 |
| 6,044,047 A * | 3/2000 | Kulas ....................... 369/30.06 |
| 6,055,766 A | 5/2000 | Nolen et al. ................... 43/112 |
| 6,067,279 A | 5/2000 | Fleming, III ............ 369/30.06 |
| 6,088,949 A | 7/2000 | Nicosia et al. ................. 43/107 |
| 6,122,230 A * | 9/2000 | Scibora .................... 369/30.03 |
| 6,212,138 B1 | 4/2001 | Kalis et al. .............. 369/30.06 |

\* cited by examiner

BLOOD-SUCKING INSECT CONTROL STATION

CROSS REFERENCE TO CO-PENDING CASE

This application is a continuation-in-part of U.S. patent application Ser. No. 09/573,382, filed May 19, 2000, entitled "Blood-Sucking Insect Barrier System and Method," the entirety of which is hereby incorporated by reference.

FIELD OF THE INVENTION

This invention relates primarily to an arrangement for selectively repelling insects from or attracting insects to a control station.

BACKGROUND OF THE INVENTION

A discussion of historical approaches to addressing insect problems is detailed in U.S. Pat. No. 5,241,778, assigned to the present assignee and hereby incorporated by reference as if set forth in its entirety herein. The '778 patent describes a method for attracting and eradicating insects in which a heartbeat sound attracts insects to a control station. According to the '778 patent, by projecting a heartbeat sound from a speaker, one or more discrete zones can be established which attract mosquitoes and other insects. There remains a need, however, to increase the zone of influence of the established attractant zone as well as its efficacy.

U.S. Pat. No. 4,168,591 discloses a method that utilizes a combination of heat and moisture to attract insects.

U.S. Pat. No. 4,506,473 discloses a method for attracting blood-sucking insects using carbon dioxide.

Applicants' co-pending parent application addresses the problem of wide-area, outdoor control of insect populations. However, there is an increasing need to control the population of blood sucking insects in an environmentally sensitive manner. The spread of the West Niles virus from tropical areas into dense population regions such as the Northeast section of the United States of America is but one example of the need to control insect populations.

What is needed in the art and heretofore has not been available is an improved apparatus for local control of insects. What is further needed is such an apparatus that is suitable for use both indoors and outdoors. The present invention satisfies these and other needs.

SUMMARY OF THE INVENTION

In one aspect, the invention provides a centralized system and method for controlling insect populations such as biting arthropods. In a preferred embodiment, a self-contained insect control station is used either alone or in coordination with other self-contained insect control stations. The invention utilizes sound waves as either an attractant or repellant in order to control pest populations in a target region. The sound waves to be employed can be selectively established to achieve the desired function. Thus, a simulated heartbeat sound or other suitable periodic low frequency sound enhanced by a resonator/soundboard (e.g., in the range of cps 20–500 cps, depending on the sound intensity and periodicity) can be employed as an attractant or as a repellant of insects such as mosquitoes and biting flies. The invention can achieve population control of insects through the use of one or more control stations that may be connected, directly or indirectly through other control stations, to a central distribution point.

The invention can make use of other factors, which may or may not be critical, depending on which insects are to be controlled and whether insect attraction or repulsion is desired. Those factors include carbon dioxide, octenol, lactic acid, acetone), and heat, to name a few. Respiratory or digestive by-products are believed to cause the mosquitoes and biting flies that have been attracted by the heartbeat sound to go into a feeding or biting mode. Whereas the suitable heartbeat sound will attract insects from a distance to the proximity of the insect control unit, a by product of respiration or digestion causes certain targeted insects to land directly on the insect control unit where they are captured or eradicated.

In a preferred embodiment, a single insect control station can be used to attract insects by the system and method described. Through the continued use of the inventive system, an insect population in the vicinity of the control station can drop to a level below which the insect no longer functions as a disease vector. Research has shown that all or at least a part of the low frequency heartbeat sound can sensitize biting insects to feeding stimulants. For example, whereas other insect control devices may typically use 200 to 500 mililiters or more of carbon dioxide per minute to cause mosquitoes to exhibit a heightened feeding behavior, our insect control unit needs only about 25 mililiters to about 125 mililiters of carbon dioxide per minute to cause a similar feeding behavior. This results in a significant cost savings, and because of the smaller carbon dioxide requirements, makes possible the construction of easily portable units for field studies and weekend use. In addition to sensitizing insects to feeding stimulants, the low frequency sound also desensitizes biting insects to the presence of their normal prey. Whereas other insect control devices can increase bite counts in areas of use, the control unit of the present invention can significantly decrease the number of bite counts in areas of use. Indeed during several field studies where literately hundreds of mosquitoes or biting flies were flying around and landing on the insect control surfaces of the unit, nearby human observers were not bitten.

In one particular aspect, the invention provides a method for attracting insects to at least one control station that is remotely positioned relative to a central node in a system of control stations. The method according to this first aspect of the invention includes the steps of generating at the central node an acoustic wave, propagating the acoustic wave through the hollow tubing, and emitting the acoustic wave at the control station to attract insects into an attractant zone proximate to the control station.

In another particular aspect, the invention provides a method for establishing a barrier to blood-sucking insects. The method according to this aspect of the invention defines a barrier by arranging plural control stations relative to a central distribution point. According to this method, a central distribution point is provided with a sound source that generates a sound wave suitable for attracting or repelling blood-sucking insects. A branching network of hollow tubing is established in which the hollow tubing is communicatively connected to the central distribution point for receiving the generated sound wave. A plurality of control stations is connected to the branching network of hollow tubing so that there is no more than a prescribed spacing between adjacent ones of the plural control stations. At least the sound wave is conveyed from the central distribution point to the plural control stations for emanation thereat to define the barrier.

In a further aspect, the invention provides a method for establishing a barrier to animal pests such as deer and rabbits, to name a few. This method is similar to the method described above, however, the sound source in this method generates a sound wave that is simulative of at least a portion of a heartbeat suitable for repelling animal pests. Otherwise, the method steps are as described above and result in sound waves emanating at the control stations to define a barrier to repel animal pests and undesired creatures.

In a preferred embodiment, a self-contained insect control station is used either alone or in coordination with other self-contained insect control stations. Each insect control station has a sound source that generates a sound wave that is simulative of a least a portion of a heartbeat. In the attraction mode, each insect control station emanates a byproduct of respiration or digestion to induce landing of the insect on the insect control station.

Methods in accordance with the foregoing aspects of the invention can include one or more of the additional steps indicated below:

a. drawing insects into the hollow tubing once attracted into the attractant zone through the use of a source of negative pressure;
 b. constructing the acoustic wave so that it is simulative of at least a portion of a heartbeat;
 c. releasing one or more of the byproducts of respiration or a volatile chemical from digestion (octenal) in the support tube or proximate to the control station;
 d. releasing an insect pesticide proximate to the control station; and providing a pathogen to biting arthropods or other insects proximate to or upon the control station.
 e. Providing a glue surface specifically designed for a high capture rate of mosquitoes and biting flies proximate to or upon the control station.

The method also can include steps and features described below in connection with the Drawing Figures and the Detailed Description of Certain Preferred Embodiments.

The significant advantage of the present invention is that a highly cost-effective and environmentally safe technique is provided to control the insect population, and particularly the population of mosquitoes and biting flies. The technique of the present invention can be employed on a large scale by municipalities to control mosquitoes and biting flies throughout large public areas, or can be employed by an individual to control the mosquito and biting fly population in a backyard or in the home. The device of the present invention can kill attracted mosquito or flies by various techniques and equipment.

In accordance with yet a further aspect of the invention, an insect control station includes a means for generating a prescribed analog signal, a speaker connected to receive the prescribed analog signal and to deliver acoustic energy to a resonator positioned in the path of the delivered acoustic energy. The control station can be implemented within a single housing or with some of its components housed separately from other components.

In one particular arrangement, the analog signal is generated using a memory and a digital to analog converter. The memory stores a digitized audio sample and delivers the digitized audio sample in response to a strobe signal. The digital to analog converter (DAC) has an input communicatively coupled to the memory and an output that outputs analog signals. The speaker receives these analog signals from the DAC and delivers the acoustic energy to the resonator.

In another particular arrangement, the analog signal is generated using a digital signal processor. The digital signal processor (DSP) is programmed with an algorithm that generates one or more prescribed analog signals that are provided to the speaker and the resonator.

In yet another particular arrangement, the analog signal is generated by mechanical elements and then provided to the speaker and the resonator.

Preferably, the acoustic energy emitted from the control stations of any of these arrangements is simulative of at least a portion of a heartbeat.

The control station of any of these arrangements can include tubing between the speaker and the resonator, with the tubing defining a path for the delivery of acoustic energy to the surrounding area. Alternatively, and in accordance with a preferred arrangement for a stand-alone control station, a resonator is spaced above the ground or other supporting surface by tubing, with a speaker positioned proximate a resonator and the resonator coupled about the speaker for delivery of the acoustic energy to the surrounding area. The tubing has an exterior surface that can be provided with a striped pattern to visually attract certain insects to the control station.

In a further, optional, arrangement, the control station can include a source of negative pressure and an inlet proximate the resonator that is sized to receive insects that are drawn through the inlet in response to negative pressure.

In yet another, optional, arrangement, a pesticide or a gluey substance is affixed to the control station, for example, on or proximate to the resonator.

In still a further, optional, arrangement, the control station includes a mechanism for delivering one or more feeding stimulants from within the support tube or proximate to the resonator. The feeding stimulants can include: carbon dioxide, heat, acetone, lactic acid, octenol, or other byproducts of respiration or digestion.

A preferred embodiment of an insect control station which can be constructed according to the invention comprises a memory which stores a digitized audio sample and delivers the digitized audio sample in response to a strobe signal, a digital to analog converter (DAC) having an input communicatively coupled to the memory and an output that outputs analog signals, a circuit which repeatedly delivers the strobe signal, an amplifier connected to the output of the DAC, a speaker connected to receive the analog signals from the amplifier and to deliver acoustic energy that is simulative of at least a portion of a heartbeat, tubing positioned below the speaker for spacing the speaker from ground (or some other support surface) and for delivering heat or other feeding stimulants and a resonator positioned in the path of the delivered acoustic energy, the resonator presenting a surface that vibrates in response to the acoustic energy and which can support a pesticide or gluey substance for controlling a local insect population.

These further objects, features, and advantages of the present invention will become apparent from the following detailed description, wherein reference is made to the figures in the accompanying drawings.

DETAILED DESCRIPTION OF CERTAIN PREFERRED EMBODIMENTS

Figure 1:
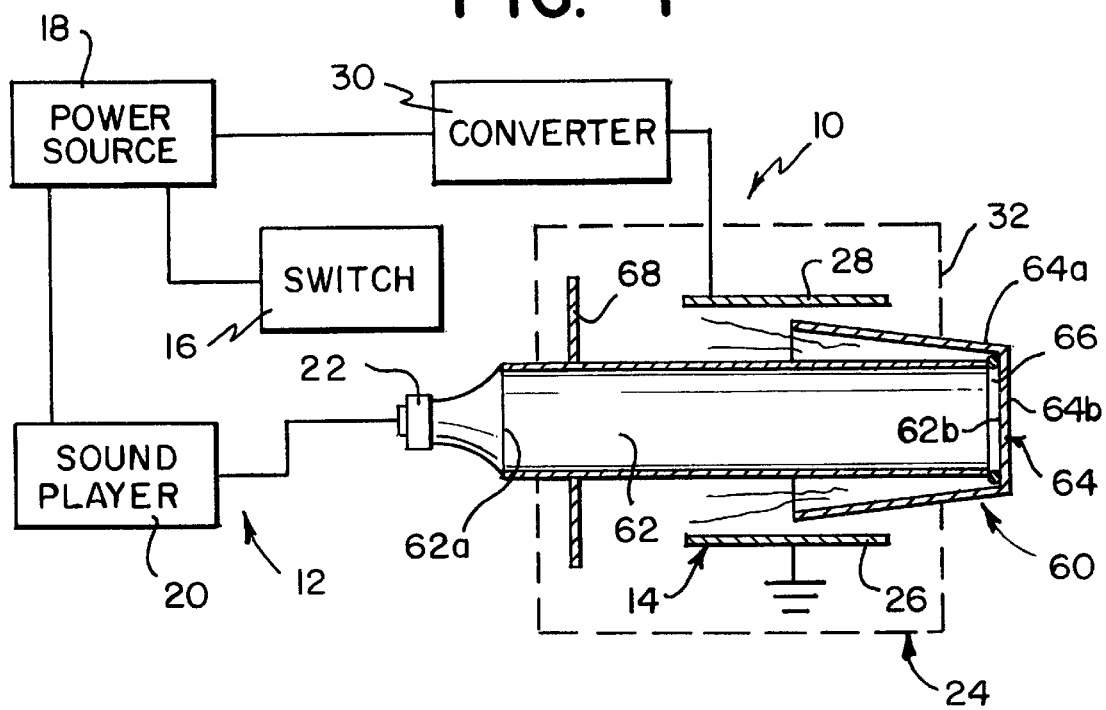
FIG. 1 is a schematic view of an insect attractant and eradication device and/or insect-repelling device according to the present invention.

By way of overview and introduction, FIG. 1 depicts an assembly or control station 10 comprising an insect attractant device 12 and an insect eradication device 14 in accordance with a preferred embodiment of the present invention. The invention can be implemented, however, without an eradication device because insects can be attracted to an area and thereby keep insects away from another area to be utilized by humans or because insects can be repelled from an area (e.g., an open window or a room) to thereby keep an interior area utilized by humans free of insects. Whether a device manufactured in accordance with the present invention includes an eradication device 14 or not, the assembly 10 is more generally referred to herein as a control station. The control station of the present invention has utility for various species of bloodsucking insects, particularly insects such as mosquitoes, stable flies and blackflies. The invention is specifically described below with regard to an application for attracting and eradicating mosquitoes and biting flies of the variety that conventionally feed on humans, although modifications to the device will be clear to one of skill in the art to attract and eradicate mosquitoes and biting flies that feed on any particular animal species, or other bloodsucking insects or other pests, as described further below.

Referring to FIG. 1, one embodiment of the control station 10 includes an attractant device 12 that comprises an on/off switch 16, an electrical power source 18, a sound player 20, and an acoustic speaker 22. The attractant device 12 utilizes very little energy, and thus can be activated continually. The attractant device 12 also can be selectively rendered operable by switch 16 and can be activated, for example, an hour before and during the time interval when children are scheduled to play in a backyard adjacent to the device. Alternatively, a conventional timing circuit (not shown) can be employed to automatically activate the control station, for example, between the hours of 5:00 a.m. and 7:00 a.m. and between 5:00 p.m. and 10:30 p.m., when mosquitoes are typically active and are generally bothersome to people.

The power source 18 is conventional and forms no part of the present invention. Suffice to say, the power source can be a conventional household power source, a generator that outputs electrical power, or a battery source.

Sound player 20 also can be conventional in design, needing only to be capable of repeatedly playing acoustic signals. The sound player 20 is fitted with either analog or digital information which, when played through the sound player, outputs an analog signal. The analog signal from the sound player 20 is provided to the speaker 22 that transduces the signal into a sound that simulates a heartbeat, as more specifically described below, to attract insects such as mosquitoes and biting flies or to repel them. Only a limited frequency range need be produced by the speaker 22 to simulate the heartbeat. The volume or decibel output of the control station is established so that the target insect or pest can detect the sound and perceive it as a heartbeat so as to be attracted to or repelled from the area of the speaker, as desired. Preferably, the acoustic output of the control station is set at a level that is not readily audible to humans. The effective area (or volume) to which mosquitoes and biting flies are attracted or repelled is at least partially a function of the decibel level output of the speaker. Once attracted, the insects will generally occupy the area (or, stated more accurately, the volume or zone) conceptually shown in FIG. 1 as being bounded by dashed lines 24 in the immediate vicinity of the control station. It has yet to be determined the statistical time period that a mosquito attracted to the control station will remain within zone 24 before losing interest.

The eradication device 14 of the control station of FIG. 1 is of the electrocution type. This type of electrocution equipment is conventionally and successfully used, for example, by illumination-type attractant devices. Accordingly, the eradication device 14 is depicted conceptually in FIG. 1, and comprises a ground end plate 26 and a charged plate 28, each spaced adjacent to the edges of attractant zone 24, generally outside of the direct path of acoustic energy delivered by the speaker 24. Plate 28 is supplied with DC power from converter 30, which in turn is connected to power source 18. The charge on plate 28 is normally insufficient to spark across ground plate 26, so that little power is normally consumed to maintain the eradication device activated. When a mosquito enters the zone 24, however, its presence is sufficient to cause electrical plate 28 to spark across to plate 26. During this intermittent sparking action, a mosquito is electrocuted. Conventional protective shielding, such as a wire mesh, can be used to ensure that twigs, birds, and children's fingers do not inadvertently enter the zone 24. Again, more sophisticated electrocution devices can be used to kill the mosquitoes. The advantage of the control station of the present invention resides in its ability to attract targeted insects into the zone 24 or repel them away from the zone, and does not reside in the type of eradication device that may or may not be employed.

In lieu of an eradication device 14, a trap can be provided within the attractant zone 24. The trap preferably comprises a gluey or sticky surface, but can comprise other traps including nettings, depending on the type of insect that is to be trapped. Insect traps using gluey surfaces are particularly useful when the control station is utilized to monitor an insect population in a desired area. Again, the advantage of the control station resides in its ability to attract targeted creatures into the zone 24 or repel them away from the zone, and not with respect to the type of trap that may or may not be provided. A preferred trap, if one is provided, is supported on the exterior surface of the control station, on or proximate to a resonator 64, described below.

Figure 2:
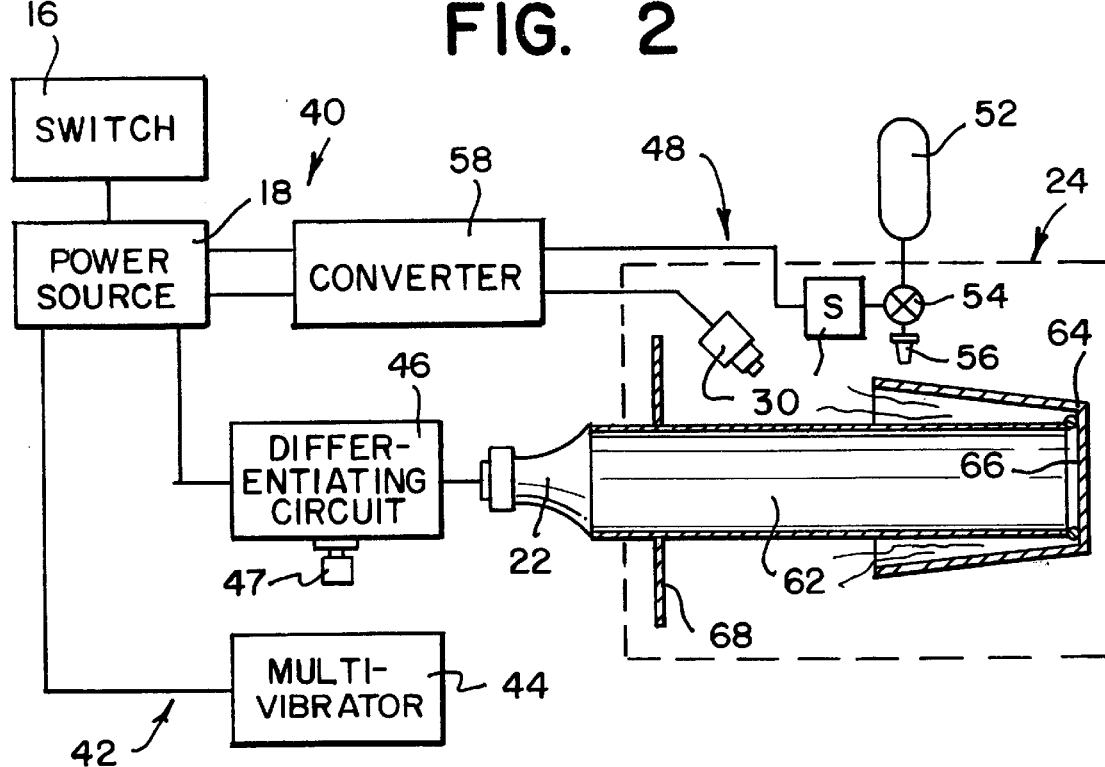
FIG. 2 is an alternative embodiment of an insect attractant and eradication device and/or insect-repelling device.

FIG. 2 depicts another embodiment of a control station 40 according to the present invention. The control station 40 includes attractant device 42 comprising a switch 16, power source 18, and speaker 22 as previously described, and further includes an astatic multivibrator 44 and a differentiating circuit 46. The multivibrator 44 is powered by source 18, and provides a square wave voltage output having a constant period and cycle ratio. Differentiating circuit 46, which is also powered by source 18, generates a time derivative of a square wave voltage output such that the output of circuit 46 comprises pulses associated with the signal supplied by the multivibrator. The diaphragm of speaker 22 is driven by the pulses from circuit 46 to provide an acoustic wave representative of the human heartbeat. An adjustment knob 47 is provided for selectively varying and "fine tuning" the frequency signals delivered to the acoustic speaker. A heartbeat emulator comprises the combination of the multivibrator 44, the differentiating circuit 46, the adjustment knob 47 and perhaps further circuitry that together emulate a complex heartbeat signal.

Also illustrated in FIG. 2 is an alternative eradication unit 48 adapted to eradicate insects such as mosquitoes. The eradication unit 48 comprises a sensor 50, an insect toxic gas container 52, a solenoid valve 54, a spray nozzle 56, and a converter 58. Electrically powered sensor 50 periodically scans the zone 24 and generates a signal when one or more mosquitoes are present within the zone 24. A triggering signal is generated within converter 58 as a result of an insect being present in the zone 24, or alternatively when a preselected number of mosquitoes, e.g., six or more, occupy the zone 24. This triggering signal results in the opening of solenoid valve 54, which can be automatically returned to its normally closed position by a spring or other biasing device after a predetermined period of time, for example, two seconds. While valve 54 is briefly open, insect toxic fluid from container 52 is expelled through spray nozzle 56 into the zone 24, thereby killing or eradicating insects within or adjacent to zone 24. The fluid within the container 52 can be of various formulations known to kill or immobilize insects, and particularly mosquitoes and biting flies, or can be of a formulation that confuses insects or otherwise prevents them from thereafter being attracted to humans or being able to bite humans. This insect toxic formulation need not be hazardous to humans, and can be expelled at a dosage that is lethal to mosquitoes within zone 24, but that is neither detected by nor harmful to human or pets within the general vicinity of the control station 40.

It should be understood that the attractant devices 12, 42 and the eradication devices 14, 48 of the embodiments of FIGS. 1 and 2 can be interchanged to form additional embodiments. Also, the control station can include a one-way trap constructed of fine mesh screen that kills, immobilizes, or traps insects, or an arrangement can be employed which drowns insects attracted into the zone 24. As previously noted, the attractant device of this invention has utility apart from being used in conjunction with an eradication device.

Figure 2A:
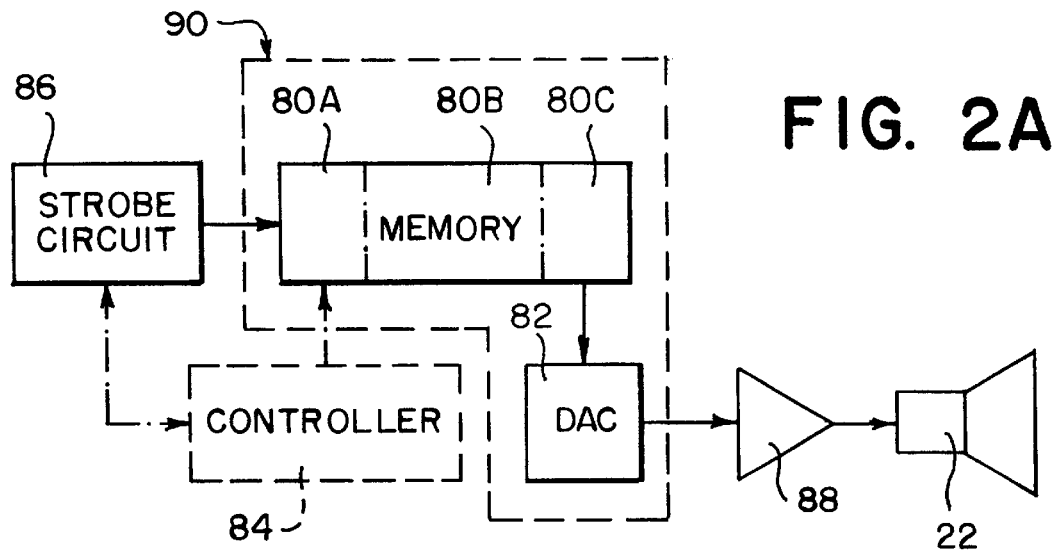
FIG. 2A is a functional block diagram of a sound player 20 that emulates a heartbeat.

FIG. 2A is a functional block diagram of a sound player 20' that emulates a heartbeat using a modem circuit design. The sound player 20' includes a memory 80 (such as a conventional RAM, SRAM, or ROM circuit) which stores digitized audio samples. The digitized audio samples comprise a series of bits that preferably represent a heartbeat sound recording. The series of bits are provided to a digital to analog converter (DAC) 82 in response to a strobe signal, starting with the first memory cell and continuing until the memory has been read. Optionally, the memory 80 is logically segmented into a plurality of addressable segments 80A, 80B, . . . That can be individually accessed so that any one of a number of digitized audio samples can be retrieved, each of which can be simulative of a heartbeat (e.g., one simulating a human heartbeat if the target is insects that bite humans and another simulating an equestrian heartbeat if the target is insects that bite horses). A controller 84 is used in a conventional manner to govern which segment of the memory 80 is accessed and which digitized audio signal is delivered in response to the strobe signal. A user operable control or selector permits manual selection of which segment of memory is read out into the DAC 82. A strobe circuit 86 provides the strobe signal. Preferably, the strobe signal is repeatedly delivered to the memory, e.g., periodically at an interval that permits the contents of memory 80 to be read, converted by the DAC into an analog signal, amplified by an amplifier 88 (if provided), and delivered to the speaker 22. Typical DAC's provide only about 50 mA of drive current and so an amplifier is appropriate for most applications. If only one digitized audio sample is included in the memory 80, then the strobe signal can be provided directly from the strobe circuit 86 to the memory 80. Otherwise, if the memory is segmented, the controller can provide the strobe signal, or the controller can be used to control the times at which the strobe signal is delivered.

The memory 80 and DAC 82 comprise a sub circuit 90 that sources a signal that emulates a heartbeat. Other circuitry can be used in lieu of these two components, such as a digital signal processor (DSP). The DSP can be programmed to generate one or more prescribed audio signals, each of which can be simulative of a heartbeat.

In accordance with a salient aspect of the present invention, the output of the speaker 22 is conveyed into the zone 24 through a sound distribution system 60. The distribution system 60 comprises a sound tube 62, the resonator 64, and may include an annular gasket 66. In one embodiment, as shown in FIGS. 1 and 2, the sound tube 62 provides a sealed chamber for conveying at least a forward wave emanating from the speaker 22 from tube end 62a to tube end 62b. In the preferred embodiment of a stand-alone control station, the tubing 62 provides support for the speaker and the resonator and can also be used to release feeding stimulants or heat near the resonator. The support tube 62 can be formed from a number of different materials PVC tubing in the range of 0.75" to 4.00" in diameter has been found to be suitable, and 2.00" diameter is presently preferred. Each end of the tubing is preferably removable for maintenance or replacement).

The resonator preferably comprises a thin walled, durable material such as polypropylene, HDPE, PET, PETE, vinyl, hard rubber, metal or other material. Ideally, the resonator is paper thin yet durable, although biodegradable materials may also be used; a balance is struck between these generally conflicting criteria to provide an effective resonator, and the foregoing list of materials can all be effective resonators. The base 64b of the resonator engages either the speaker or the end 62b of the sound tube, depending on the embodiment, directly or indirectly through the gasket 66. In a conventional manner, compressed sound waves press against the base 64b and generate amplified sound waves within the zone 24, preferably sound waves that emulate at least selected portions of a heartbeat. The sound waves exit annular sidewalls 64a of the resonator, which can have a generally frustoconical shape (as shown). The annular sidewalls 64a of the resonator also can be comprised of parallel flat surfaces mounted such that they vibrate in response to the sound waves.

The resonator can alter the frequency and distribution of the acoustic waves produced by the speaker 22. The resonating function of the resonator 64 results from the coupling with the sound tube 62. Consequently, the resonator can be positioned remote from the speaker itself. Alternatively, the resonator 64 can be located adjacent the speaker 22 and end 62a of the sound tube, with the sound tube extending therefrom to convey the amplified acoustically attractive sound waves to one or more zones 24. If the resonator is not tightly coupled, it will not greatly modify the acoustic waves but will instead basically vibrate, which itself can be an assist in attracting certain insects because it serves as a soundboard. A thin walled inverted pot or cover can be loosely positioned above the sound tube 60 (for the embodiment of FIG. 1) or above the speaker (for the embodiment of FIG.__) as a resonator 64', in lieu of the resonator 64, with the acoustic wave instead being imparted with a desired characteristic, by providing a suitable analog signal to the speaker 22.

It should be understood, therefore, that the resonator can modify the sound waves emanating from the speaker 22 or not. The resonator is preferably removable, and more preferably disposable, especially when equipped with a gluey substance or a pesticide.

Optionally, the exiting sound waves can co-act on a surface 68 which is opposite the base 64b or which is positioned to direct waves exiting from the resonator 64 in a desired direction, for example, within the zone 24. The sound distribution system 60 amplifies critical components of a heartbeat signal to better attract insects to the control station or to repel insect or animal pests therefrom, while better differentiating critical components of the sound emitted by the speaker 22 from background noise.

Figure 3:
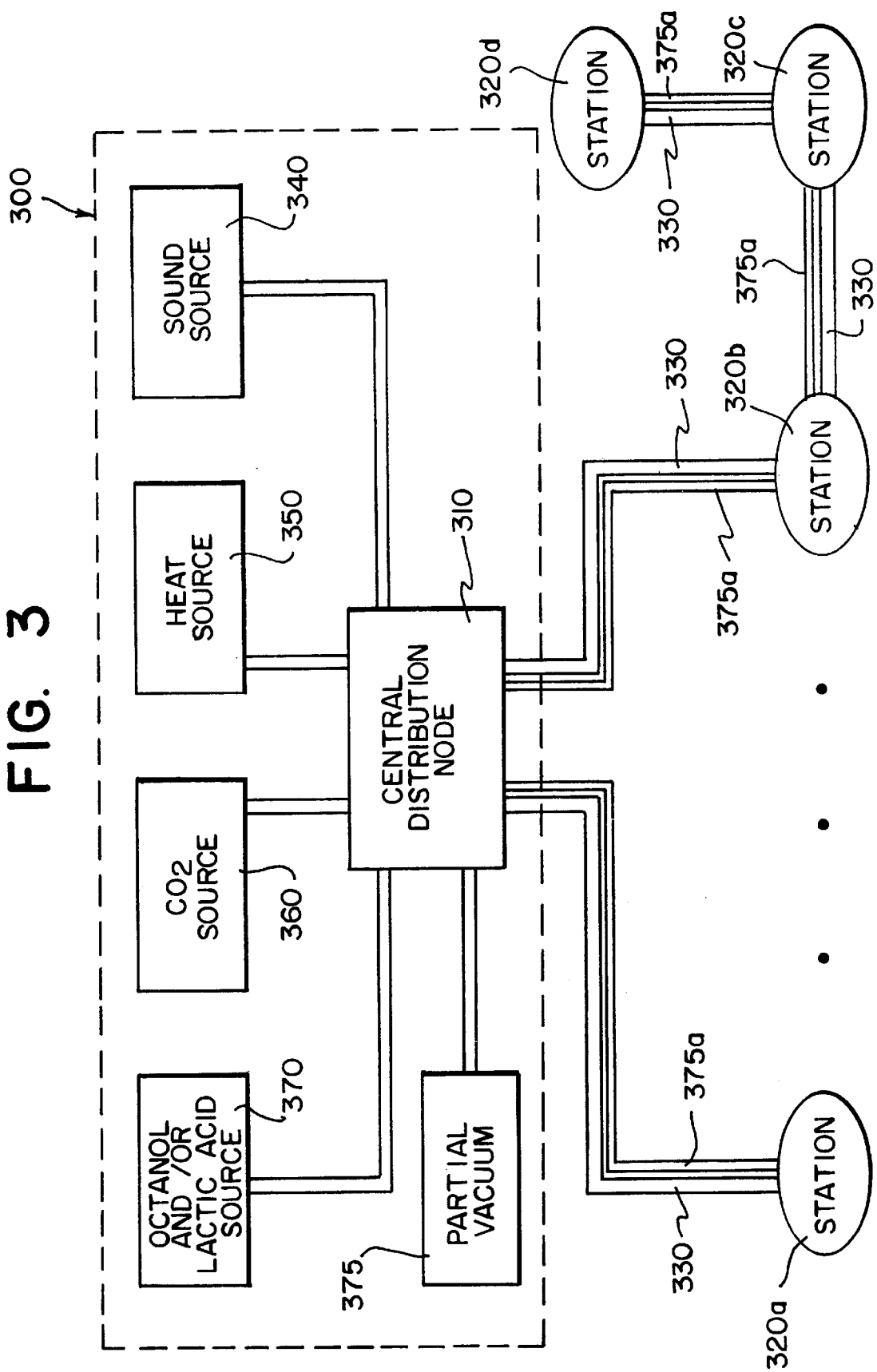
FIG. 3 illustrates a centralized system for either attracting insects to or repelling pests from plural control stations.

In accordance with a further aspect of the present invention and with reference now to FIG. 3, a centralized system 300 is described in which a plurality of control stations 320a–320d (only four shown; more generally, "control stations 320") are interconnected and driven from player 20). The centralized system 300 has a central distribution node 310 configured to deliver various sources of attractants or repellants to remotely positioned control stations 320 through a suitable coupling 330. The coupling can consist of one or more parallel or coaxial tubes, for example, PVC tubing which carry the various sources to the remote control stations 320. The coupling is preferably positioned underground, but need not be, and may consist of 0.75" PVC electrical grade hollow tubing. The centralized arrangement permits relatively inexpensive control stations 320 to be positioned over a widely dispersed geographic area to control pests within that area.

The components of control station 10 of FIGS. 1, 2 and 2A have been selectively included in either the central node 310 or remote stations 320, yet remain interconnected by the coupling 330. The following description of sources that can be distributed by the central distribution node 310 applies to the control station 10 described above. In particular, the control station of FIGS. 1 and 2 can be fitted with one or more of the sources described herein to achieve a desired embodiment, and can include valves, as necessary, to regulate the flow of heat or gas from the control station 10.

One of the sources distributed by the central distribution node 310 is a sound source 340. The sound source provides sound waves through the coupling 330 to the plural control stations 320. The sound waves are generated by the speaker 22 in the manner described above in connection with FIGS. 1 and 2, and are propagated through the sound tube 60, which may be the same tubing as the coupling 330. The resonator 64 can be positioned at each control station, via a tight or loose coupling of the resonator to the coupling 330, or can be positioned adjacent the speaker.

Another of the sources distributed by the central distribution node 310 is a heat source 350 which can be used to deliver a heated gas (e.g., air, or air containing the sound waves from the sound source 340) to the plural control stations 320 through the coupling 330. The presence of heat and its temperature at a given control station can be a critical factor for some pests, but not for others. Any heat to be delivered to the control stations 320 can be delivered together with the sound waves through the sound tube 60 or by way of a separate delivery tube.

FIG. 3 also shows gas sources 360 and 370 for delivering carbon dioxide gas and the vapors of octenol and/or lactic acid from the central distribution node, through the coupling 330 and to the remote control stations 320. Preferably, these substances are delivered at a controllable rate proximate to the resonator, either from the support tubing or externally. The support tubing may also be used to deliver heat or repellants.). The controlled delivery of carbon dioxide gas remote from the device, for example, can excite certain blood-sucking insects free of any undesired anesthetization effect that might be associated with higher or uncontrolled levels of carbon dioxide gas released near the device. It is believed that a significant carbon dioxide pulse of about several cubic feet of gas or vapor at an interval of about every 4–5 minutes to about every 10 minutes fosters a feeding frenzy in the mosquitoes that are attracted to the control stations.

In addition, a source of negative pressure provided through the support tubing can establish a partial vacuum near the resonator for drawing insects away from the resonator for collection at a remote collection device (e.g., net or bag) or control device (e.g., electrified grid). Because the source of negative pressure is not located proximate the resonator any noise that it might make will not undermine the attractive influence of the heartbeat sound being radiated from each control station. Optionally, baffles can be positioned relative to the source of negative pressure to isolate sound from that source and prevent it from propagating toward the resonator.

Each of the control stations 320 includes control valves (e.g., ball valves) that permit the flow of gas, heat or sound waves and partial pressure to be regulated at each station. If the control stations are serially coupled to the central distribution node 310 (such as control stations 320b, 320c, and 320d), then the control valve is preferably positioned in a branch leading to one control station in the series so that it can decrease the flow to one station while only passively affecting the flow to other control stations in the series. A feedback arrangement can be used as known in the art of heating, ventilation and air conditioning, to better control the flow to other stations when the flow to one is adjusted.

Figure 3A:
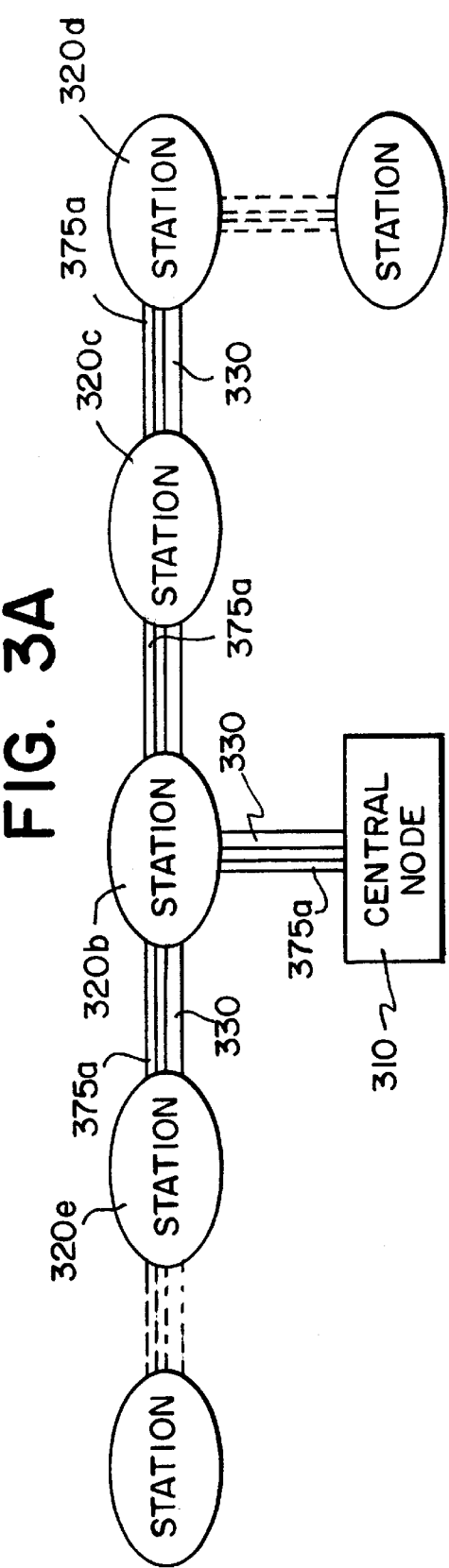
FIGS. 3A and 3B illustrate alternative arrangements of control stations in a centralized system as in FIG. 3.
Figure 3B:
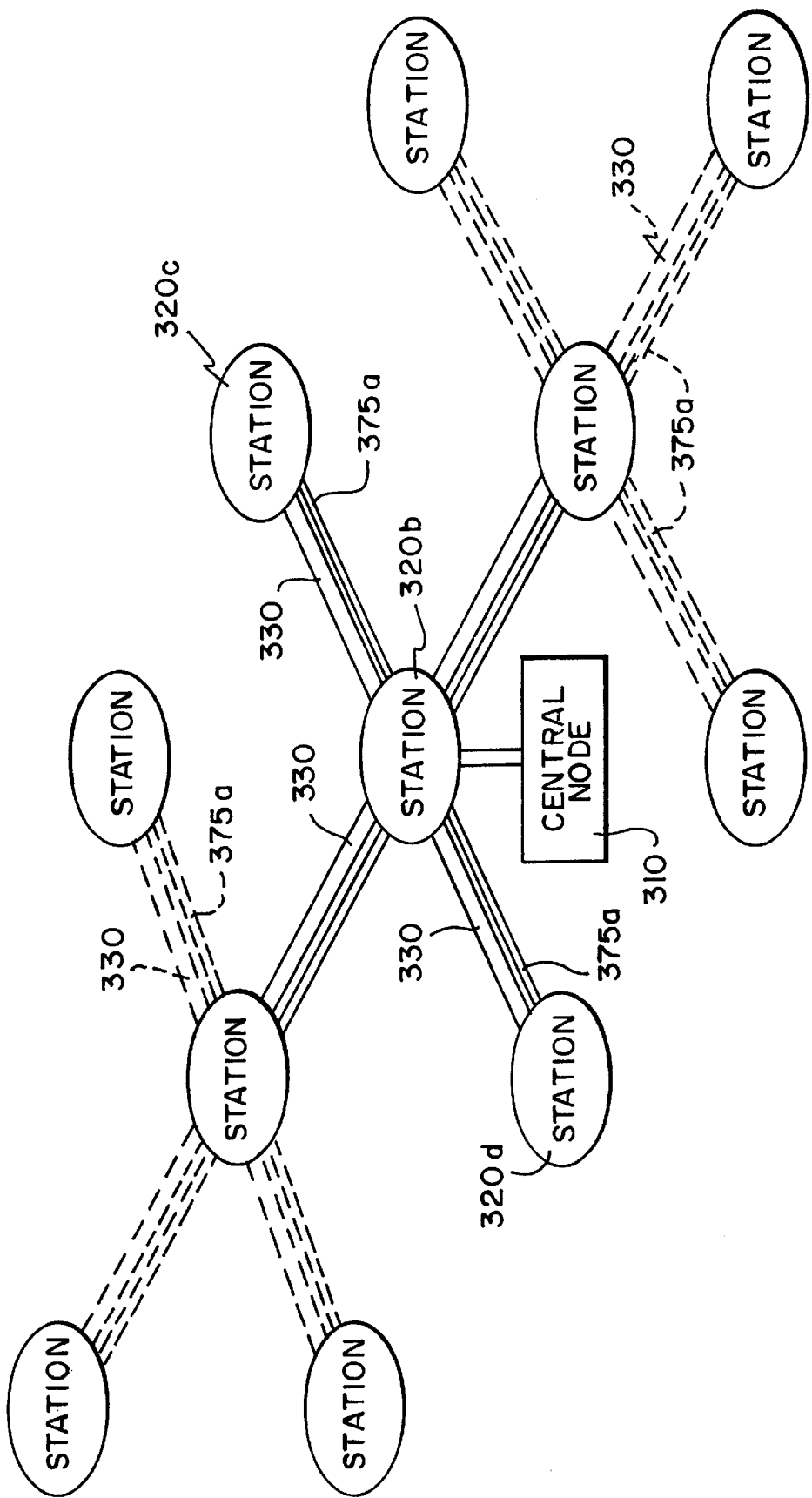

A variety of arrangements of couplings 330 and control stations 320 can be connected to a single central distribution node. FIGS. 3A and 3B illustrate, for example, two different arrangements in which the control stations 320 are positioned remote from the central distribution node in different patterns to more effectively control pests in a geographic region of interest. The dashed lines indicate the possibility of extensions of the pattern shown in solid lines. Of course, many other arrangements are possible, including combinations of the arrangements shown in the Figures, the arrangements of FIGS. 3, 3A and 3B being merely illustrative of three possible arrangements.

We have also determined that a single control station's speaker 22 can be used to drive the resonators of multiple control stations. The low frequency sound waves can set up an attraction vibration in other (remote) control stations in which the sound has been turned off. An alternative arrangement is to place a speaker 22 at each control station. All the speakers can be driven by a source at the central distribution node and can be connected by electrical wires provided in the tubing 320. In such an arrangement, tube 320 can also be used to distribute, if desired, carbon dioxide, heat, repellant, etc. to the control stations.

Figure 4:
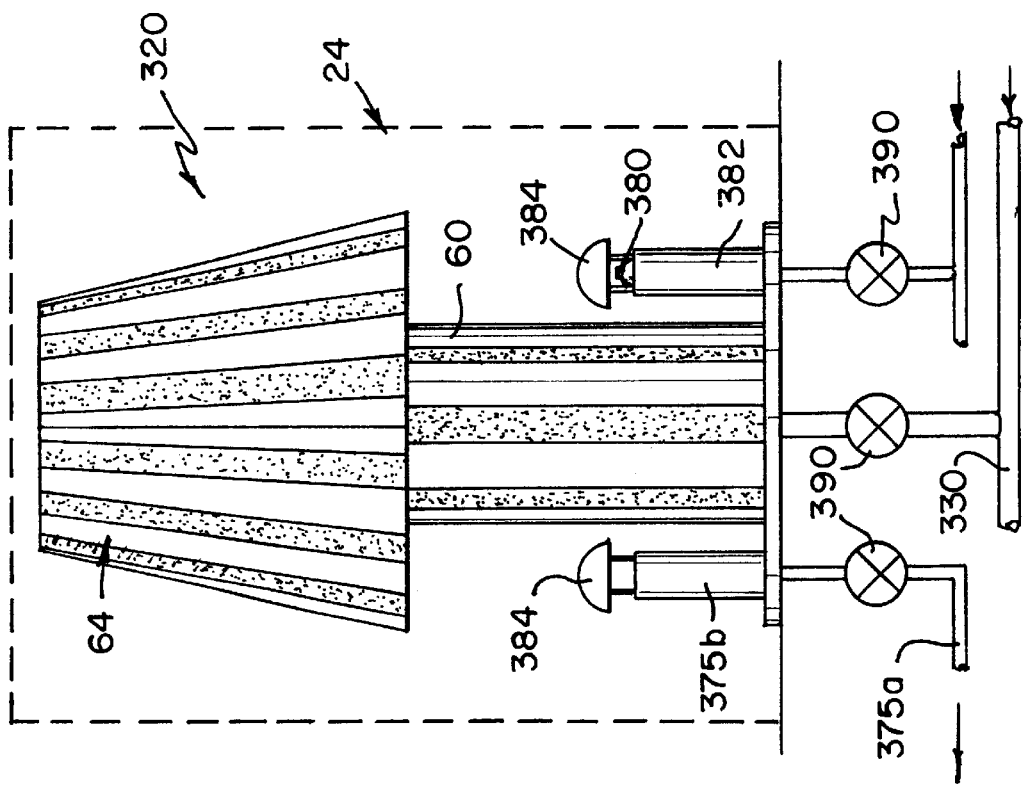
FIG. 4 illustrates one control station in detail.

Referring now to FIG. 4, a control station 320 is described in detail. The elements of the control station 320 differ from a corresponding portion of the control station 10 only in the coupling 330. In a unitary station design, each control station 320 includes a sound tube 60 that communicates with the coupling 330 to deliver heartbeat sound waves from the speaker 22 connected to the sound source 340 to the location of the control station. The sound tube 60 preferably projects approximately 1.5 feet above the ground, but can be shorter or longer and more preferably includes the sound reflector 68. The sound tubes of different control stations can be positioned at different heights to ensure capture or control of both low- and high-flying insects. Optionally, the resonator 64 can be tightly seated upon the sound tube 60, as described above in connection with FIG. 1.

Alternatively, the resonator can be included proximate the speaker 22, or not included at all, and the element 64 can instead be loosely seated over the sound tube 60 to keep the coupling 330 free of rain and debris, and also to vibrate and direct and radiate the heartbeat sound waves within the zone 24. A sound reflector 68 assists in filling the zone 24 with the acoustic energy delivered through the coupling 330 to the sound tube.

At a given distance from the control station, the intensity of the acoustic waves emanating therefrom can vary depending on the position of the sound pressure meter relative to the control station. Thus, the intensity can be higher directly above the control station due to the resonator, if any, and the sound reflector, depending on its orientation, relative to the intensity of the acoustic energy in other directions. Beyond a threshold intensity level, insects may not be attracted to a control station, at least in a given direction, and so the amplification of the heartbeat sound is preferably set to maximize the attraction of insects across as many directions as desired (e.g., to have the intensity within a prescribed range or below a threshold level alongside the control station). The control station can emit sound at a decibel level suitable for attracting mosquitoes, for at least portions of a heartbeat sound, which is in the −40 dB to −10 dB range, as measured with a spectrum analyzer (1 cps increments), or 50 dB to 80 dB range, as measured with a digital sound level meter.

The control station further has a remote gas distribution port 380 positioned within the zone 24 to supply gas and/or vapor from the sources 360, 370, and other sources, if any gas delivery is desired. The gases are delivered through a supply tube 382 that is carried within or alongside the tube coupling 330. A rain shield 384 or the like keeps the tube 382 free of rain and debris. In addition, each control station has one or more ports 375b for insect collection, if desired, connected to the partial vacuum 375 via vacuum tubing 375a.

In addition, each control station has one or more valves 390 that control the relative amount of sound, heat, gas, and vacuum force that is delivered by each of the tubes 330 and the gas tube 382 and partial vacuum tube 375a. The port 375b, if desired, preferably has a rain cover and may or may not project above the sound reflector 68.

The portion of the sound tube which projects from the base preferably includes an attractive surface (such as a striped surface) and can be further covered with a pressure sensitive adhesive or an insecticide. The stripes can assist in attracting certain blood-sucking insects that have been drawn to the region of the control station by the sound waves. It is believed that certain insects are attracted to light surfaces while others are attracted to dark surfaces, and so the stripes provide a useful pattern to attract insects with either of these preferences. As can be appreciated, however, other patterns can be provided to tailor the surface to the preferences of various insects (e.g., camouflage, dots, zig-zags, etc.).

In addition to or instead of an adhesive, the control station can source a pathogen such as a bacteria or fungus which can be conveyed with the insect back to its breeding grounds to kill eggs, larvae, and other adult insects.

Figure 5:
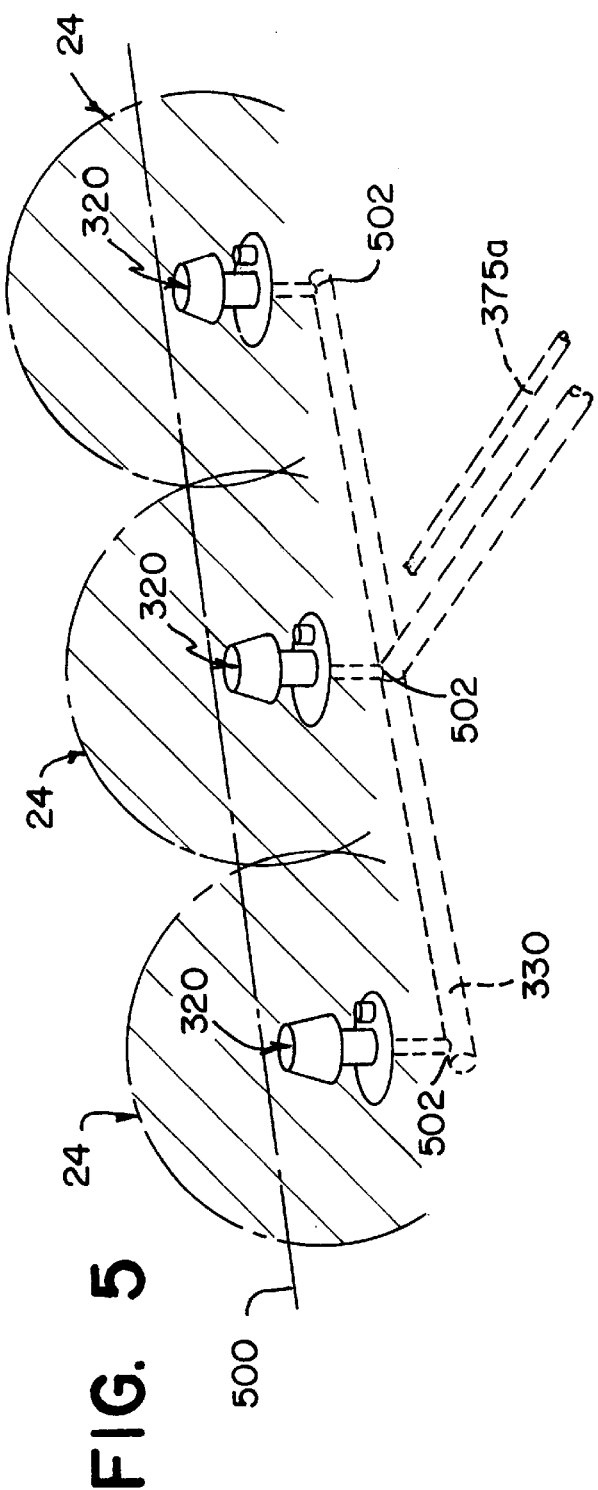
FIG. 5 illustrates a perspective view of several control stations interconnected in a centralized system.

In FIG. 5, several control stations are shown in a centralized system that provides a linear barrier that can be used to repel specific pests, or to attract insects such as mosquitoes to one of the control stations 320. The details of each control station, including the valves 390 (not shown in this Figure), are described above in connection with FIG. 4. As can be appreciated from FIG. 5, a plurality of control stations 320 can be arranged in any desired manner to define a perimeter 500 of overlapping zones 24 (shown shaded) which serve as either a repellant or attractant of selected pests. The control stations 320 are spaced anywhere from about 50 feet to about 300 feet apart, but are spaced so as to generally ensure that the effectiveness of the control stations in defining the perimeter of overlapping zones 24 is not compromised. The control stations are connected to the central distribution node (not shown) through the hollow tube couplings 330 and tubes 375a (shown broken away at a location remote from the control stations). For ease of illustration, the coupling 330 includes several right angle bends 502; however, superior acoustic wave travel through the hollow tubing can be obtained through the use of more gradual bends, that is, bends that are less than 90°.

Figure 6:
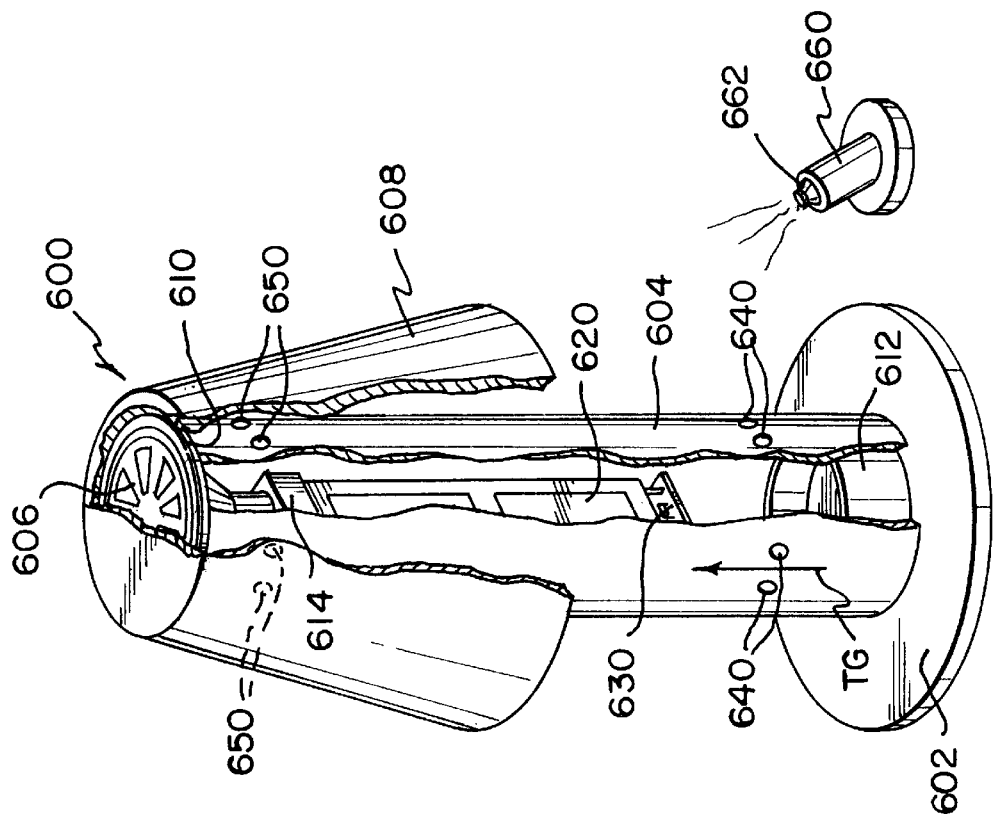
FIG. 6 illustrates a stand-alone control station in accordance with a presently preferred embodiment.

Referring now to FIG. 6, an insect control station 600 is described. The control station includes a base 602, a support or tubing 604, a speaker 606 mounted at the top of the tubing, and a resonator 608 disposed about the speaker and the top of the tubing. Optionally, a gasket 610 is positioned between the speaker 606 and the top of the tubing 604. In a preferred implementation, the tubing 604 comprises a four-inch tube of PVC and the speaker 606 is sized such that its frame can seat directly upon the tubing or the gasket, if a gasket is provided.

The tubing 604 is preferably seated in frictional engagement with a nipple 612 extending upwardly from the base 602. The fictional engagement between the nipple and tubing provides a stable pedestal to support the speaker 606, including its magnet 614. In the embodiment of FIGS. 6, 8, a battery pack 620 and circuitry 630 are both suspended from the speaker 606, however, this is not required. The battery pack and circuitry can be housed external of the tubing 604 or elsewhere within the tubing or base. The circuitry 630 is described in further detail with reference to FIG. 7. It should be understood that the battery pack 620 is not required; instead, the control station 600 can be powered by an external source, for example, a low voltage source. One suitable low voltage source is a 12 VAC voltage source that is commonly used in connection with outdoor lighting applications. The control station 600 can tap into that low voltage source to power the circuitry 630.

As can be seen in FIG. 6, the tubing further includes one or more air inlets 640 adjacent a lower margin of the tubing, clear of the nipple 612, and one or more air outlets 650 adjacent an upper margin of the tubing. During normal operation of the control station 600, the circuitry 630 generates heat, and the heat generated by the circuitry disposed within the tubing 604 encourages a convection current between the air inlets and the air outlets. Consequently, a thermal gradient is established between the lower margin of the tubing and the upper margin of the tubing (see arrow TG), all within the vicinity of the resonator 608. Preferably, the heat generating element is included in the circuitry 630 to generate a sufficient amount of heat so as to establish a temperature gradient in and around the normal body temperature, and, in any event, a temperature range which is different than the ambient temperature. Because certain insects and mosquitoes can see within the infrared spectrum, or can sense temperature from a distance, the thermal gradient established across the height of the tubing 604 can serve to attract a greater variety of insects and mosquitoes. A desired range of temperatures to establish across the height of the tubing 604 is a range of temperatures varying from just below body temperature to a temperature somewhat above body temperature. For example, a temperature variation between 93 and a 105 degrees is preferred. Such a range of temperature can be achieved, for example, when using an 8-watt resistor connected across a 12 VAC source.

Instead of a resistor as the generating element, the insect control station 600 can include a light bulb to generate heat as well as light. If the tubing 604 is made of a translucent material, then the light bulb can provide illumination to the surrounding area while the control station is operative to control local insect and mosquito populations.

FIG. 6 further illustrates a delivery tube 660 that has an outlet 662 for delivering a secondary stimulant in order to place mosquitoes and insects in a biting mode. In particular, FIG. 6 illustrates carbon dioxide as the secondary stimulant. The primary attraction of mosquitoes and insects is due to the sound emanated by the speaker 606, as conveyed by the resonator 608. The carbon dioxide is preferably delivered from a portable tank (e.g., 1 lb. tank) which has a regulator set to deliver a low level of carbon dioxide (e.g., 25 ml per minute).

Figure 7:
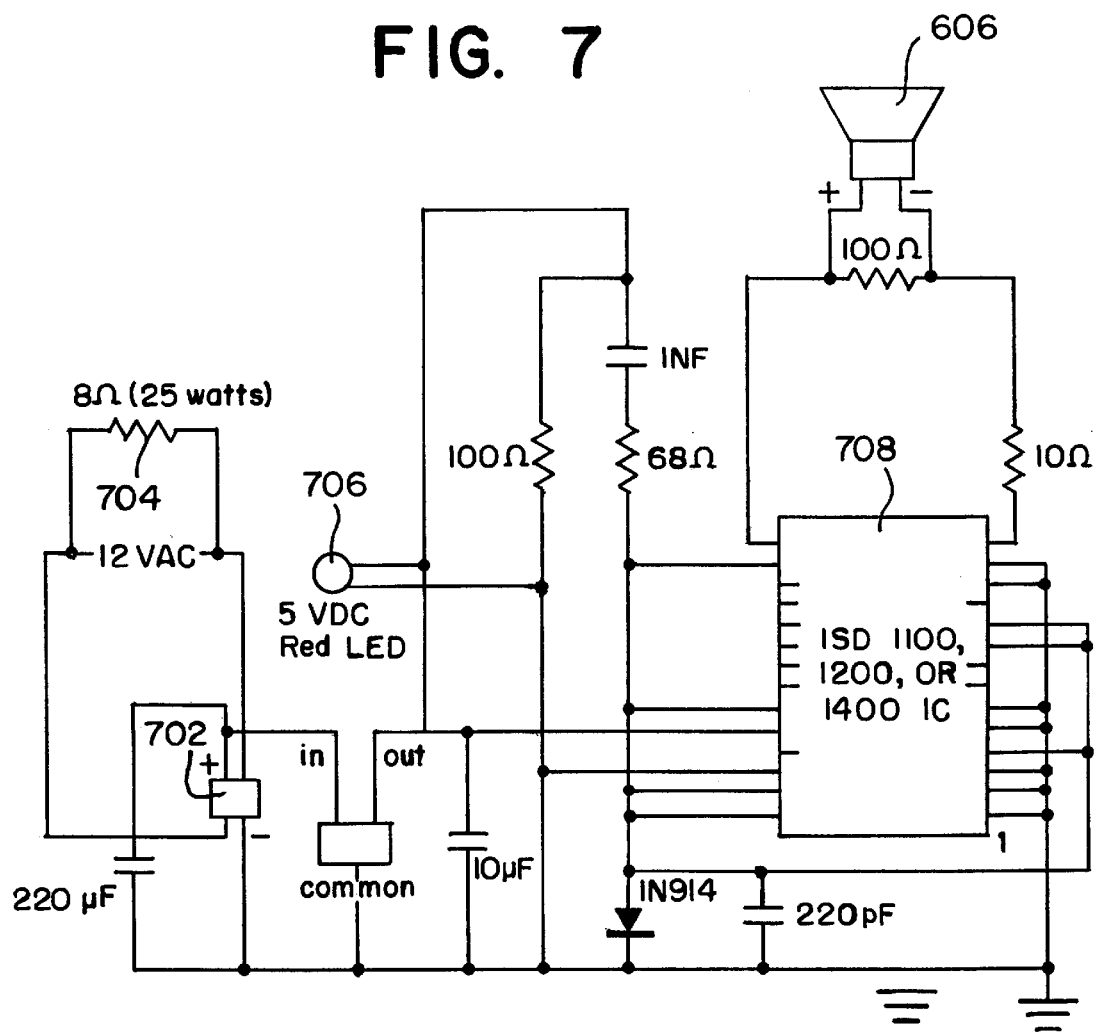
FIG. 7 is a schematic diagram of a circuit that can be used to drive one or more insect control stations constructed in accordance with the invention.

Referring now to FIG. 7, a circuit 700 is shown in schematic form for driving the speaker 606 with a signal that represents a heartbeat sound (or some other sound). The circuit is powered by a 12 VAC source, after rectification by a four-way bridge rectifier 702 to provide a 5 VDC signal. A resistor 704 is connected across the incoming voltage signal and generates heat to establish a convection current, as described above. An LED 706 is included to indicate the "on" or "off" state of the circuit, but is not required. The circuit is driven by an integrated circuit 708, which is preferably an ISD brand Series 1100, 1200, or 1400 integrated circuit. For example, an ISD 1110 provides ten seconds of storage for recording a sound segment to be reproduced by the speaker 606 and is a suitable circuit to use in the circuitry 630. The integrated circuit 708 includes an amplifier to drive the speaker, and requires a minimal amount of external connections to place it in an infinite loop, as is done in the preferred embodiment. More specifically, the integrated circuit 708 is preferably programmed with a heartbeat sound and configured by external resistors and capacitive and/or inductive elements to repeatedly play the programmed sound. Consequently, a continuous heartbeat sound can emanate from the speaker 606 to drive the resonator 608 and attract or repel insects and mosquitoes, as desired. FIG. 7 further illustrates capacitors and a diode connected in a conventional manner to drive the ISD integrated circuit, which elements form no part of the present invention and can be selected with reference to the application notes for the ISD integrated circuit, as understood by those of skill in the art.

The sound emanating from spaced control stations can establish a virtual barrier for insects between the control stations, with the acoustic attractant emanating at a decibel level within a prescribed range, or the acoustic repellant emanating at a decibel level beyond the prescribed range or above a predetermined level. For animals, the acoustic repellant emanation needs only to be at the decibel level audible to the pest that is to be repelled.

The particular insect to be attracted or repelled is targeted through the delivery from the central distribution node 310 to the control stations 320 of a predetermined combination of critical factors which include at least a heartbeat sound and possibly also heat, carbon dioxide, octenol, and/or lactic acid, each in a controlled amount. Carbon dioxide, for example, can be delivered to each of the control stations at a rate of about 50 to about 500 cc/min. The lower the rate, the better to minimize the gas requirements and cost.

Within the perimeter 500 (only one boundary shown), humans can recreate generally free of the targeted pest. Thus, a perimeter can be defined in a backyard, a hotel, a country club, a golf course, a public part, etc. to make outdoor space more enjoyable for humans.

Several observations are noteworthy to understand the effectiveness of the technique according to the present invention. Our studies suggest that heat, carbon dioxide, lactic acid, acetone or other byproducts of respiration and digestion are necessary to excite biting insects. Evidence has illustrated that, contrary to public impressions, mosquitoes are not drawn to humans by heat of the human body, carbon dioxide output from humans, or their odor, but are strongly attracted to humans by their cardiac sounds. Mosquitoes are, in fact, attracted to and obtain blood from reptiles, such as snakes, which are not hot-blooded and obviously have an odor quite dissimilar to humans. Mosquitoes also are attracted to weak, sick, or aged people more than to healthy individuals. These people frequently have a heartbeat that generates a periodicity of signals at significantly higher rates than those of healthy individuals. Accordingly, it is believed that while mosquitoes will be attracted to an acoustic signal indicative of a healthy individual in the periodicity (pulse rate) range of from 50 to 90 beats per minute, mosquitoes will be strongly attracted to an acoustic signal in excess of 90 beats per minute. The low frequency sound given off by a heartbeat that attracts mosquitoes is preferably in the range of from about 150 cps to about 350 cps, l, and more preferably in the 150 cps to 250 cps range in which Applicants have determined that the heartbeat has a primary peak.

Thus, the recorded waveform in the player 20 or from the emulator can simulate a human heartbeat or particular components therein. For example, a waveform can be constructed to have a primary peak in the 150 cps to 250 cps range and a secondary peak in the 300 cps to 500 cps range. A suitable waveform can include frequency components in these ranges alone, or so that the frequency components in these two peaks dominate other frequencies in the waveform. The periodicity of the waveform, that is, the number of times that the signal appears, can be dynamically adjusted, for example, by a program running on a programmed machine such as the machine referred to above, or by circuitry comprising the emulator. A waveform having acoustic energy in the range of 20 to 500 cps is generally desired.

Equipment that can be used to generate acoustic signals representing the human heartbeat is described, for example, in U.S. Pat. No. 3,317,092 and U.S. Pat. No. 3,994,282. Alternatively, an actual human heartbeat can be recorded and rebroadcast to attract insects. Either signal can be electronically altered or fine-tuned to present a signal most suitable for attracting a preselected insect (e.g., mosquitoes, fleas, ticks, blackflies, etc.) given the geographical area that the control station is positioned.

Any obstructions in the coupling can be removed using a high-pressure blowout that is selectively connected to the system for maintenance purposes (not shown).

The medical profession, and particularly cardiologists, have recognized that the acoustic signals from a heartbeat are not simply the "lub-dub" sounds familiar to lay individuals. More particularly, medical specialists have recognized the significance of the cadence, rhythm, and relationship between particular components of the heart sound, which are medically referred to as the S1, S2, S3, and S4 components of the heartbeat. While each of these component sounds in turn can have fluctuations functionally dependent upon the respiratory cycle of the individual, the characteristic frequency of these components is not significantly affected by this respiratory cycle. During both inspiration and expiration, the characteristic frequency of the S1 and S2 components for a healthy heart is normally in the range of from 110 cps to 120 cps, while the characteristic frequency of the S3 component is in the range of from 70 cps to 90 cps. The S4 component can be inaudible to humans using a normal stethoscope for a patient less than 50 years old, although there is no reason to believe that the S4 component, which is generally in the range of 50 cps to 70 cps, is not detected by mosquitoes. As indicated above, evidence has shown that mosquitoes are strongly attracted to individuals with a damaged heartbeat, and the medical profession has studied in depth the timing, configuration, and duration of heart murmurs. While certain murmurs have a relatively low frequency in the range of from 60 cps to 100 cps, heart murmurs more often are in the medium-frequency range of from 100 cps to 250 cps, or are in the higher frequency range of more than 300 cps associated with "blowing."

The above evidence suggests that mosquitoes will be attracted to acoustic signals in the range of from 50 cps to 120 cps, and will be strongly attracted to its acoustic signals in the range of from about 150 cps to about 350 cps. Applicants presently believe that one or more frequencies in the range of 150 cps to 250 cps together with one or more frequencies in the range of peak in the 300 cps to 500 cps range comprise the best signal for attracting mosquitoes.

Discrete "ejection sounds" or clicks associated with a damaged heart have a frequency in the 160 to 180 cps range, and these clicks also can be a reason that mosquito are particularly attracted individuals with damaged hearts. We determined that mosquitoes are attracted to sound waves from an acoustic speaker that replicates the sounds of a heartbeat, and thus signals within the frequency range described above would preferably be output from a speaker in accordance with the "lub-dub" rhythm and cadence associated with a heartbeat.

The method of the present invention is suggested by the apparatus disclosure above. The method for attracting bloodsucking insects, such as mosquitoes, to an attractant zone comprises generating a source of electrical energy, generating control signals powered by the source of electrical energy, and generating acoustic waves simulating a human heartbeat in response to the control signals for attracting insects to an attractant zone. If desired, the insects can be eradicated once attracted to the zone utilizing the techniques described above. The device of this invention requires little if any maintenance, and can be reliably installed and utilized by relatively inexperienced personnel.

It should be noted that no one set of critical or design factors will work well for all blood-sucking insects. The parameters for attracting insects can change from location to location and with the seasons and time of day. The present invention, however, allows for ready modification of the control station placement and operational parameters in a quick and inexpensive way. For example, all control stations can be adjusted from the central location, and the performance of one relative to others can be adjusted by way of the valves 390.

By setting the signature of the heartbeat sound to mimic the heartbeat of a natural predator, birds and other nuisance animals can be repelled. The proper acoustical signature can be achieved in a variety of ways including a combination of shape, size, thickness, coatings and additives (e.g., pigments, fibers, etc.). A sound-scarecrow can be established to repel, for example, birds, rats, rabbits, deer and racoons from a garden or farm to protect crops and grain/food intended for consumption by farm animals. The heartbeat sound of dogs, foxes, cats and bobcats, for example, can be used to repel a variety of nuisance animals. The repelling heartbeat sound should cycle so that it becomes louder and more rapid in such a manner as to prevent pests from becoming adapted to the heartbeat sound. Such a control station can be mounted on a vehicle to repel animals (e.g., deer from a road as a vehicle approaches the animals.

Tubing that contains air or gas is still hollow. Tubing is hollow even if it has caps or stops at one or both ends.

Various changes and modifications will become apparent from the foregoing discussion, and are considered within the scope of the invention. Such changes and modifications should be understood as being within the scope of this invention, which is limited only by the claims attached hereto.

We claim:

1. An insect control station comprising:
   (a) a digital signal processor (DSP) programmed with an algorithm which generates a prescribed analog signal;
   (b) a speaker connected to receive the prescribed analog signal from the DSP and to deliver acoustic energy wherein the acoustic energy is simulative of at least a portion of a heartbeat;
   (c) a resonator positioned in the path of the delivered acoustic energy; and
   (d) a gluey surface supported on the control station.

2. The insect control station as in claim 1, wherein the gluey surface is supported on or proximate to the resonator.

3. The insect control station as in claim 1, wherein the acoustic energy comprises acoustic waves in the range of from 20 cps to 500 cps.

4. The insect control station as in claim 1, further comprising circuitry to repeatedly deliver a strobe signal to the DSP.

5. The insect control station as in claim 4, wherein the DSP delivers one of a plurality of prescribed analog signals in response to the strobe signal.

6. The insect control station as in claim 5, wherein the prescribed analog signals are each simulative of at least a portion of a heartbeat.

7. An insect control station comprising:
   (a) a digital signal processor (DSP) programmed with an algorithm which generates a prescribed analog signal;
   (b) a speaker connected to receive the prescribed analog signal from the DSP and to deliver acoustic energy wherein the acoustic energy is simulative of at least a portion of a heartbeat;
   (c) a resonator positioned in the path of the delivered acoustic energy; and
   (d) a pesticide supported on the control station.

8. The insect control station as in claim 7, wherein the pesticide is supported on or proximate to the resonator.

9. An insect control station comprising:
   (a) a memory which stores a digitized audio sample and delivers the digitized audio sample in response to a strobe signal;

(b) a digital to analog converter (DAC) having an input communicatively coupled to the memory and an output that outputs analog signals;

(c) a speaker connected to receive the analog signals from the DAC and to deliver acoustic energy wherein the acoustic energy is simulative of at least a portion of a heartbeat;

(d) a resonator positioned in the path of the delivered acoustic energy; and (e) a gluey surface supported on the control station.

10. The insect control station as in claim 9, wherein the gluey surface is supported on or proximate to the resonator.

11. An insect control station comprising:

(a) a memory which stores a digitized audio sample and delivers the digitized audio sample in response to a strobe signal;

(b) a digital to analog converter (DAC) having an input communicatively coupled to the memory and an output that outputs analog signals;

(c) a speaker connected to receive the analog signals from the DAC and to deliver acoustic energy wherein the acoustic energy is simulative of at least a portion of a heartbeat; and (d) a resonator positioned in the path of the delivered acoustic energy; and (e) a pesticide supported on the control station.

12. The insect control station as in claim 11, wherein the pesticide is supported on or proximate to the resonator.

13. An insect control station comprising:

(a) a digital signal processor (DSP) programmed with an algorithm which generates a prescribed analog signal;

(b) a speaker connected to receive the prescribed analog signal from the DSP and to deliver acoustic energy wherein the acoustic energy is simulative of at least a portion of a heartbeat;

(c) a resonator positioned in the path of the delivered acoustic energy;

(d) tubing between a support base and the speaker with the resonator seated proximate to the speaker; and (e) a source of negative pressure connected to the tubing, the control station having an inlet proximate the resonator sized to receive insects that are drawn through the inlet in response to negative pressure.

14. An insect control station comprising:

(a) a memory which stores a digitized audio sample and delivers the digitized audio sample in response to a strobe signal;

(b) a digital to analog converter (DAC) having an input communicatively coupled to the memory and an output that outputs analog signals;

(c) a speaker connected to receive the analog signals from the DAC and to deliver acoustic energy wherein the acoustic energy is simulative of at least a portion of a heartbeat; and (d) a resonator positioned in the path of the delivered acoustic energy wherein the resonator responds to the acoustic energy from the speaker with vibrations that define an attractant zone, the insect control station further comprising an eradication mechanism positioned proximate to or within the attractant zone wherein the eradication mechanism includes a detector to detect the presence of an insect within the attractant zone, the eradication mechanism being activated in response to detection of the insect.

15. The insect control station as in claim 14, wherein the eradication mechanism, when activated, delivers a pesticide into the attractant zone.

16. An insect control station comprising:

(a) a memory which stores a digitized audio sample and delivers the digitized audio sample in response to a strobe signal;

(b) a digital to analog converter (DAC) having an input communicatively coupled to the memory and an output that outputs analog signals;

(c) a speaker connected to receive the analog signals from the DAC and to deliver acoustic energy;

(d) a resonator positioned in the path of the delivered acoustic energy;

(e) an amplifier connected between the DAC and the speaker; and (f) a source of negative pressure connected to the tubing, the control station having an inlet proximate the resonator sized to receive insects that are drawn through the inlet in response to negative pressure.

17. The insect control station as in claim 16, further comprising tubing between the speaker and the resonator, the tubing defining the path for delivery of the acoustic energy.

18. The insect control station as in claim 17, wherein the tubing includes an exterior surface having a striped pattern supported thereon, the pattern serving to attract insects to the control station.

19. The insect control station as in claim 18, wherein the tubing has air intake holes and air outflow holes, the control station further comprising an element positioned within the tubing that produces heat in response to the passage of current therethrough, the air intake holes and air outflow holes being arranged relative to the heat-producing element to establish convection currents of heated air when heat is being produced by the heat-producing element.

20. The insect control station as in claim 16, further comprising tubing between a support base and the speaker with the resonator seated proximate to the speaker.

21. The insect control station as in claim 20, wherein the tubing includes an exterior surface having a striped pattern supported thereon, the pattern serving to attract insects to the control station.

22. The insect control station as in claim 16, wherein the acoustic energy is simulative of at least a portion of a heartbeat.

23. The insect control station as in claim 22, wherein said mechanism is a killing mechanism comprising an eradication mechanism positioned proximate to or within the attractant zone.

24. The insect control station as in claim 22, wherein the acoustic energy comprises acoustic waves in the range of from 20 cps to 500 cps.

25. The insect control station as in claim 16, further comprising circuitry to repeatedly deliver the strobe signal to the memory.

26. The insect control station as in claim 25, wherein the memory includes at least two segments, each segment storing a respective digitized audio sample.

27. The insect control station as in claim 26, further comprising a controller connected to the memory to govern which segment of the memory is accessed and which digitized audio signal is delivered in response to the strobe signal.

28. The insect control station as in claim 26, further comprising a selector connected to the controller, the selector permitting manual selection of the digitized sample to be delivered to the DAC.

29. The insect control station as in claim 26, wherein the digitized audio sample stored in each segment of the memory is simulative of at least a portion of a heartbeat.

30. The insect control station as in claim 16, further comprising a fluid outlet for delivering from the control station one or more feeding stimulants selected from the group of: carbon dioxide, heat, acetone, lactic acid, octenol, a byproduct of respiration and a byproduct of digestion.

31. An insect control station comprising:
（a) a digital signal processor (DSP) programmed with an algorithm which generates a prescribed analog signal;
(b) a speaker connected to receive the prescribed analog signal from the DSP and to deliver acoustic energy wherein the acoustic energy is simulative of at least a portion of a heartbeat;
(c) a resonator positioned in the path of the delivered acoustic energy; and
(d) tubing between a support base and the speaker with the resonator seated proximate to the speaker wherein the tubing has air intake holes and air outflow holes, the control station further comprising an element positioned within the tubing that produces heat in response to the passage of current therethrough, the air intake holes and air outflow holes being arranged relative to the heat-producing element to establish convection currents of heated air when heat is being produced by the heat-producing element.

32. The insect control station as in claim 31, wherein the resonator responds to the acoustic energy from the speaker with vibrations that define an attractant zone, and further comprising an eradication mechanism positioned proximate or within the attractant zone.

33. The insect control station as in claim 32, wherein the eradication mechanism includes a detector to detect the presence of an insect within the attractant zone, the eradication mechanism being activated in response to detection of the insect.

34. The insect control station as in claim 33, wherein the eradication mechanism, when activated, delivers a pesticide into the attractant zone.

35. The insect control station as in claim 31, further comprising a mechanism for delivering from the tubing one or more feeding stimulants selected from the group of: carbon dioxide, heat, acetone, lactic acid, octenol, a byproduct of respiration and a byproduct of digestion.

36. The insect control station as in claim 35, further comprising an amplifier connected between the DSP and the speaker.

37. An insect control station comprising:
(a) a memory which stores a digitized audio sample and delivers the digitized audio sample in response to a strobe signal;
(b) a digital to analog converter (DAC) having an input communicatively coupled to the memory and an output that outputs analog signals;
(c) a circuit to repeatedly deliver the strobe signal;
(d) an amplifier connected to the output of the DAC;
(e) a speaker connected to receive the analog signals from the amplifier and to deliver acoustic energy that is simulative of at least a portion of a heartbeat;
(f) tubing positioned between a support base and the speaker;

(g) a resonator positioned in the path of the delivered acoustic energy, the resonator presenting a surface that vibrates in response to the acoustic energy and which can support a pesticide or gluey substance for controlling a local insect population; and
(h) a source of negative pressure connected to the tubing, the control station having an inlet proximate the resonator sized to receive insects that are drawn through the inlet in response to negative pressure.

38. The insect control station as in claim 37, further comprising a pesticide supported on the control station.

39. The insect control station as in claim 37, further comprising a gluey substance supported on the control station.

40. The insect control station as in claim 37, further comprising a mechanism for delivering from the tubing one or more feeding stimulants selected from the group of: carbon dioxide, heat, acetone, lactic acid, octenol, a byproduct of respiration and a byproduct of digestion.

41. The insect control station as in claim 37, wherein the tubing has air intake holes and air outflow holes, the control station further comprising an element positioned within the tubing that produces heat in response to the passage of current therethrough, the air intake holes and air outflow holes being arranged relative to the heat-producing element to establish convection currents of heated air when heat is being produced by the heat-producing element.

42. The insect control station as in claim 37, wherein the tubing includes an exterior surface having a striped pattern supported thereon, the pattern serving to attract insects to the control station.

43. The insect control station as in claim 37, wherein the memory includes at least two segments each storing a respective digitized audio sample and wherein the circuit includes a controller that is configured to govern which segment of the memory is accessed and which digitized audio signal is delivered in response to the strobe signal.

44. The insect control station as in claim 43, further comprising a selector connected to the controller, the selector permitting manual selection of the digitized sample to be delivered to the DAC.

45. An insect control station comprising:
(a) a memory which stores a digitized audio sample and delivers the digitized audio sample in response to a strobe signal;
(b) a digital to analog converter (DAC) having an input communicatively coupled to the memory and an output that outputs analog signals;
(c) a circuit to repeatedly deliver the strobe signal;
(d) an amplifier connected to the output of the DAC;
(e) a speaker connected to receive the analog signals from the amplifier and to deliver acoustic energy that is simulative of at least a portion of a heartbeat;
(f) tubing positioned between a support base and the speaker wherein the tubing has air intake holes and air outflow holes, the control station further comprising an element positioned within the tubing that produces heat in response to the passage of current therethrough, the air intake holes and air outflow holes being arranged relative to the heat-producing element to establish convection currents of heated air when heat is being produced by the heat-producing element; and
(g) a resonator positioned in the path of the delivered acoustic energy, the resonator presenting a surface that vibrates in response to the acoustic energy and which can support a pesticide or gluey substance for controlling a local insect population.

46. The insect control station as in claim 45, wherein the tubing includes an exterior surface having a striped pattern supported thereon, the pattern serving to attract insects to the control station.

47. The insect control station as in claim 45, further comprising a source of negative pressure connected to the tubing, the control station having an inlet proximate the resonator sized to receive insects that are drawn through the inlet in response to negative pressure.

* * * * *